(12) United States Patent
Dürr et al.

(10) Patent No.: US 8,801,339 B2
(45) Date of Patent: Aug. 12, 2014

(54) CONVEYOR DEVICE FOR PNEUMATICALLY CONVEYING BULK MATERIAL

(75) Inventors: Michael Dürr, Wolfegg (DE); Reinhard Ernst, Weingarten (DE); Klaus-Peter Lang, Bad Waldsee (DE); Heiko Schwibode, Bad Waldsee (DE); Friedrich Straub, Ravensburg (DE); Egon Zechner, Weingarten (DE); Jochen Kniess, Aulendorf (DE)

(73) Assignee: Coperion GmbH, Stuttgart (DE)

( * ) Notice: Subject to any disclaimer, the term of this patent is extended or adjusted under 35 U.S.C. 154(b) by 768 days.

(21) Appl. No.: 12/967,295

(22) Filed: Dec. 14, 2010

(65) Prior Publication Data
US 2011/0142553 A1   Jun. 16, 2011

(30) Foreign Application Priority Data
Dec. 14, 2009 (DE) .......................... 10 2009 054 596

(51) Int. Cl.
*B65G 53/04* (2006.01)
(52) U.S. Cl.
USPC ................ 406/95; 406/94; 406/192; 138/116
(58) Field of Classification Search
USPC ........................ 406/138, 94, 95, 192; 138/116
See application file for complete search history.

(56) References Cited

U.S. PATENT DOCUMENTS

| | | | | |
|---|---|---|---|---|
| 424,638 A * | 4/1890 | Walker | ............................. | 406/95 |
| 1,930,782 A * | 10/1933 | Turner | ............................. | 165/95 |
| 3,240,531 A * | 3/1966 | Lippert et al. | ................. | 406/50 |
| 3,524,478 A * | 8/1970 | Allenspach et al. | .......... | 138/111 |
| 3,759,578 A * | 9/1973 | Muschelknautz et al. | ...... | 406/95 |
| 3,782,452 A * | 1/1974 | Ceplon | ........................ | 165/135 |
| 4,095,847 A | 6/1978 | Wear | | |
| 4,281,946 A * | 8/1981 | Kanics | ............................. | 406/95 |
| 4,595,317 A * | 6/1986 | Moller et al. | ................... | 406/95 |
| 4,684,467 A * | 8/1987 | Cloud | ............................ | 210/519 |
| 4,930,544 A * | 6/1990 | Ziu | ................................ | 138/113 |
| 5,190,415 A * | 3/1993 | Allerton | ........................ | 406/118 |
| 5,360,291 A * | 11/1994 | Shimizu | ..................... | 405/183.5 |
| 7,014,392 B2 * | 3/2006 | Duwe et al. | ..................... | 406/95 |

FOREIGN PATENT DOCUMENTS

| | | |
|---|---|---|
| DE | 1 174 256 B | 7/1964 |
| DE | 2 102 301 A1 | 8/1972 |
| DE | 6 609 690 U | 8/1972 |
| DE | 37 11 122 C1 | 7/1988 |
| DE | 196 13 338 C2 | 1/1998 |
| EP | 1 382 554 B1 | 1/2005 |

* cited by examiner

*Primary Examiner* — Joseph Dillon, Jr.
(74) *Attorney, Agent, or Firm* — Browdy and Neimark, PLLC

(57) ABSTRACT

A conveyor device is used for the pneumatic conveying of bulk material. The conveyor device has a main conveyor pipe and a plurality of bypass conveyor pipe sections which are separate from one another and arranged one behind the other within the latter. The main extent direction of the bypass conveyor pipe sections runs along the main conveyor pipe. The bypass conveyor pipe sections in each case have an inlet opening and an outlet opening for conveyor gas. The inlet opening, when the main conveyor pipe is horizontally installed, is arranged in a cross sectional portion of the main conveyor pipe, which is located above a cross sectional portion of the main conveyor pipe, in which the outlet opening is arranged. The result is a conveyor device, of which the efficiency, in other words the ratio of the conveying power and the conveyor gas quantity used, is improved.

9 Claims, 16 Drawing Sheets

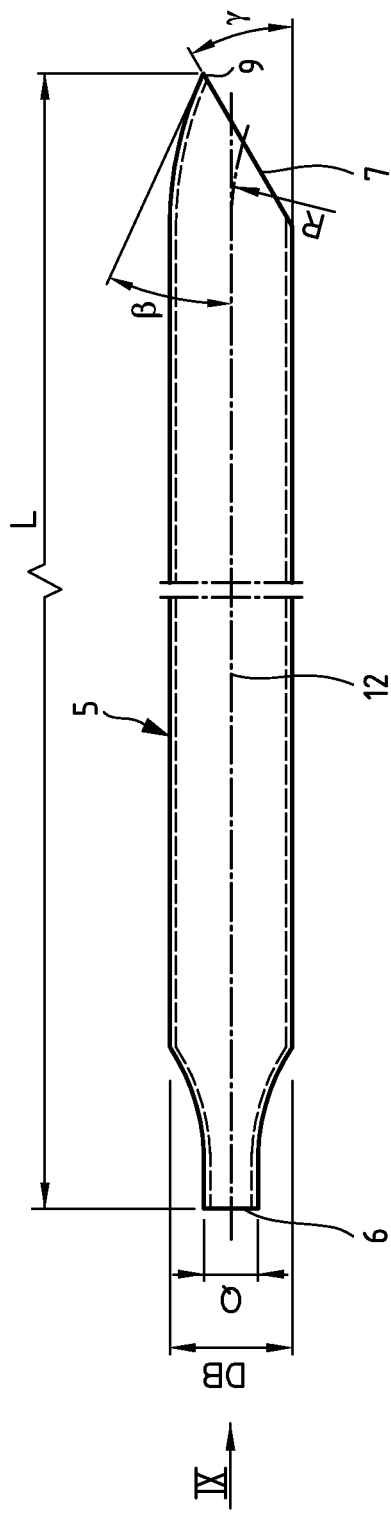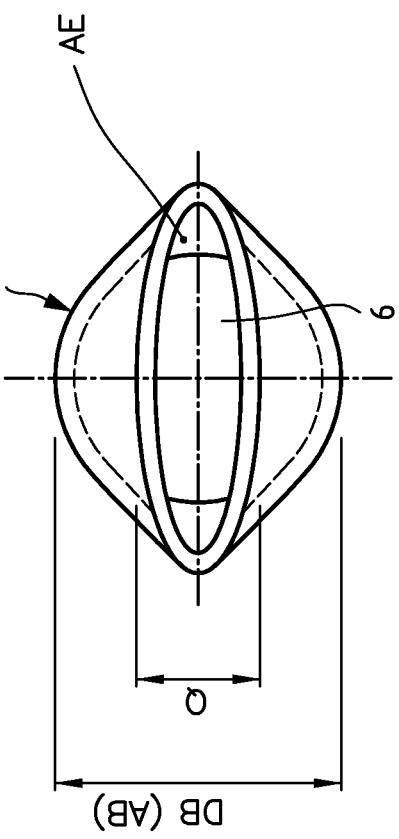

CONVEYOR DEVICE FOR PNEUMATICALLY CONVEYING BULK MATERIAL

FIELD OF THE INVENTION

The invention relates to a device for pneumatically conveying bulk material. The invention also relates to a conveyor system with a conveyor device of this type.

BACKGROUND OF THE INVENTION

Conveyor devices of the type mentioned at the outset with a main conveyor pipe and a bypass conveyor pipe arranged running within the main conveyor pipe are known from a series of publications. Mentioned representatively for these are DE-PS 1 174 256, DE 37 11 122 C2, DE-PS 2 102 301 and EP 1 382 554 B1.

SUMMARY OF THE INVENTION

An object of the present invention is to develop a conveyor device of the type mentioned at the outset in such a way that its efficiency, in other words the ratio of the conveying power and the conveyor gas energy used, in other words, the conveyor gas quantity used or the conveyor gas pressure used, is improved.

This object is achieved according to the invention by a conveyor device, in which the inlet opening, when the main conveyor pipe is installed, in main conveyor pipe segments with a horizontal course component of the main conveyor pipe, is arranged in a cross sectional portion of the main conveyor pipe, which is located above a cross sectional portion of the main conveyor pipe, in which the outlet opening is arranged.

According to the invention an inlet opening arranged above the outlet opening, viewed in the bulk material conveying direction, leads to the possibility of allowing the conveyor gas to flow from a part volume remote from the base region of the main conveyor pipe, in which the bulk material is conveyed in normal operation, into the bypass conveyor pipe section. This arrangement avoids a relatively large quantity of bulk material undesirably reaching the bypass conveyor pipe sections via the inlet openings. As, viewed from the pipe base of the main conveyor pipe, the inlet opening of the bypass conveyor pipe sections is located above the outlet opening, in the case where a plug starts to form, the inlet opening is reached late by accumulating bulk material, which makes the plug formation more difficult, so undesired bulk material accumulations are generally broken up before reaching the inlet opening of the bypass conveyor pipe portions. This reliably avoids clogging of the bypass conveyor pipe sections. Pressure drop of the conveyor gas along the conveyor device can be minimised by the design of the bypass conveyor pipe sections. In total, an increased efficiency of the conveyor device is produced. The active, lasting flowing in or swirling in of the conveyor gas via the bypass conveyor pipe sections leads to a fluidisation of the bulk material and therefore avoids or prevents depositing of the bulk material at the base of the main conveyor pipe with a plug formation undesirably resulting therefrom. If a bulk material plug should nevertheless have formed in the main conveyor pipe, the conveyor gas can flow through the bypass conveyor pipe section, at the place the plug has formed, past the plug and break it up from behind. As a bulk material plug formation is effectively prevented, high deflection forces are avoided, which otherwise occur in that bulk material plugs are pushed through the conveyor device and therefore exert corresponding forces on the conveyor device at deflection points because of their mass inertia. Accordingly supports of the conveyor device can be designed smaller in dimension. In addition, a conveying gas pressure level can be utilised without excessive pressure peaks occurring. The inlet opening of the bypass conveyor pipe sections can be further spaced apart from a central longitudinal axis of the main conveyor pipe than the outlet opening. The outlet opening of the bypass conveyor pipe sections may be located above the central longitudinal axis of the main conveyor pipe or may, alternatively, be located close to the pipe base of the main conveyor pipe. The inlet opening of the bypass conveyor pipe sections may be configured with a reduced internal cross section compared to the remaining bypass conveyor pipe section and may in particular be squeezed. The outlet opening of the bypass conveyor pipe sections may be arranged spaced apart from a pipe base of the main conveyor pipe. Alternatively, it is possible for the outlet opening to be arranged directly adjacent to the pipe base of the main conveyor pipe.

An oblique course of the bypass conveyor pipe sections, in which a bypass conveyor pipe section, the pipe course of which is straight, is at least adjacent to the inlet opening, and runs at an angle to a central longitudinal axis of the main conveyor pipe, induces the possibility of a channel formation for the conveyor gas in the bulk material, so, on the one hand, the formation of undesired plugs is prevented and, on the other hand, the breaking up of plugs which are nevertheless formed is enabled. The oblique position can be used to increase a level difference of the outlet opening relative to the inlet opening, in which the outlet opening is less spaced apart from the pipe base of the main conveyor pipe than the inlet opening. The inlet opening can then only be reached with difficulty by undesired bulk material accumulations or plugs. The outlet opening, in this case, is located advantageously close to the upper edge of the depositing bulk material flow of the main conveyor pipe, which leads to a rapid and effective swirling of bulk material, which tends to be deposited on the pipe base. An oblique course of the bypass conveyor pipe sections can also be used for the targeted directing of the conveyor gas in the direction of the pipe base of the main conveyor pipe, which further favours a rapid and effective swirling of the bulk material.

A bent pipe course, in which the pipe course of a bypass conveyor pipe section is adjacent to the outlet opening, is bent toward a pipe base of the main conveyor pipe, results in the conveying gas, which flows out of the outlet opening, being directed in the direction of the base of the main conveyor pipe, which further induces a fluidisation of bulk material deposits on the pipe base. As an alternative to a bent course of the bypass conveyor pipe section, a straight course of the bypass conveyor pipe section or a course angled toward the central longitudinal axis in the region of the outlet opening may be implemented. The bypass conveyor pipe section, following the inlet opening, may firstly have a straight course and thereafter up to the outlet opening, have a bent course. A length ratio $l_G/L$ between a length $l_G$ of a region running straight of the bypass conveyor pipe section after the inlet opening and a total length L of the bypass conveyor pipe section in the main conveyor pipe may be in the range between 0.1 and 0.8 and may be in the range of between 0.15 and 0.6.

The bypass conveyor pipe section may firstly run straight in a first segment in the course between the inlet opening and the outlet opening, then bent in a further segment and then straight again in a further segment up to the outlet opening. In this case, the pipe course of the bypass conveyor pipe section after the bent intermediate segment adjacent to the outlet opening is straight again.

In a further configuration, the pipe course of the bypass conveyor pipe section between the inlet opening and the outlet opening may be bent overall. In this variant, there is thus no segment which runs straight of the bypass conveyor pipe section between the inlet opening, optionally after a squeezed region, and the outlet opening.

A common bracket for at least some of the bypass conveyor pipe sections, which is fixed, on the one hand, to an inner wall of the main conveyor pipe and, on the other hand, to the bypass conveyor pipe sections, leads to the possibility of preassembling the bypass conveyor pipe sections on the bracket and to then fix the bracket with the preassembled bypass conveyor pipe sections on the inner wall of the main conveyor pipe 3. The connections can be welded joints. In particular, all the bypass conveyor pipe sections of the conveyor device may be attached to one and the same bracket.

A bracket cross section having a cross section which opens toward the bypass conveyor pipe sections, advantageously leads to a channel formation between the bracket and the bypass conveyor pipe section, which advantageously reduces the flow resistance within the conveyor device. The bracket may have an angled, in particular an L-cross section. The bracket may have a bent cross section, for example in the form of a part circle portion, for example in the form of a half, a three quarter or a ⅝ circle. The bracket may have an open rectangular cross section. Alternatively, the bracket may, for example, be formed from rectangular solid material.

Overlapping bypass conveyor pipe sections, in which bypass conveyor pipe sections which are adjacent are arranged overlapping one another axially in the main conveyor pipe, can be accommodated in a compact manner in the main conveyor pipe. An arrangement of this type of the bypass conveyor pipe sections is particularly suitable for bulk material that is easy to fluidise and light. In this case, a channel-forming bracket for the bypass conveyor pipe sections can be omitted. A degree of overlapping, in other words a ratio between an overlapping length and a length of the bypass conveyor pipe sections, may be in the range of between 5% and 40%.

Bypass conveyor pipe sections with a rectangular cross section may have advantages during manufacturing. Bypass conveyor pipe sections of this type may be arranged in such a way that two side bisectors of the rectangular cross section are located on a centre plane of the main conveyor pipe. Alternatively, an arrangement is possible, in which corners of the rectangular cross section of the bypass conveyor pipe sections are located on this centre plane, in other words, a rhombus-like arrangement of the bypass conveyor pipe sections in the main conveyor pipe.

The bypass conveyor pipe sections may be mirror-symmetrical with respect to a vertical centre plane of the main conveyor pipe; this is, however, not compulsory. In a configuration of the bypass conveyor pipe sections, in which an outlet pipe region of the bypass conveyor pipe section with an outlet opening, which is spaced apart from a bypass pipe axis, is pivotably arranged relative to a vertical centre plane of the main conveyor pipe about a pivoting angle, this mirror-symmetry is deliberately deviated from, so an advantageous swirled guidance of the conveyor gas leaving the outlet openings of the bypass conveyor pipe sections can be achieved. As a result, the fluidisation of the bulk material can be improved again in particular in the area of a pipe base of the main conveyor pipe. Bypass conveyor pipe section with various pivoting angles and in particular also bypass conveyor pipe sections with different orientations of the pivoting angle about a bypass pipe axis can be used in and counter to the clockwise direction.

The advantages of a conveyor system with a conveyor device for pneumatically conveying bulk material with a main conveyor pipe, with a plurality of bypass conveyor pipe sections, which are separate from one another, arranged one behind the other within the main conveyor pipe and the main extent direction of which runs along the main conveyor pipe, with, in each case, an inlet opening for conveyor gas to enter the bypass conveyor pipe section, and an outlet opening for the conveyor gas to leave the bypass conveyor pipe section, correspond to those which have already been discussed above with reference to the conveyor device according to the invention. A conveyor gas source and a bulk material feed device, for example in the form of a cellular wheel sluice, which is arranged downstream of a bulk material storage container, may belong to the conveyor system.

Embodiments of the invention will be described in more detail according to the drawings.

BRIEF DESCRIPTION OF THE DRAWINGS

FIG. 8 shows a side view of the bypass conveyor pipe section;

FIG. 9 shows an end face view of an inlet opening of the bypass conveyor pipe section according to the viewing direction IX in FIG. 8;

DESCRIPTION OF THE PREFERRED EMBODIMENTS

With the aid of FIGS. 1 to 3 and 8 to 10, a configuration of a conveyor device 1 for pneumatically conveying bulk material 2 will be described below, which, for example, is indicated schematically in FIG. 2.

The conveyor device 1 has a main conveyor pipe 3. The main conveyor pipe 3 has an external diameter DF. FIG. 2 shows, axially interrupted, a total portion of the main conveyor pipe 3. This total portion, at its two ends, has connection flanges 4, by means of which identically constructed total sections of the main conveyor pipe 3 can be connected to one another or by means of which the total portion can be connected to other conveyor components of a conveyor system, of which the component is the conveyor device 1. The conveyor device 1 shown in FIG. 2 may have a length of, for example, 6 m. The main conveyor pipe 3 has a round cross section. In principle, other cross sectional shapes of the main conveyor pipe 3 are also possible.

Figure 1:
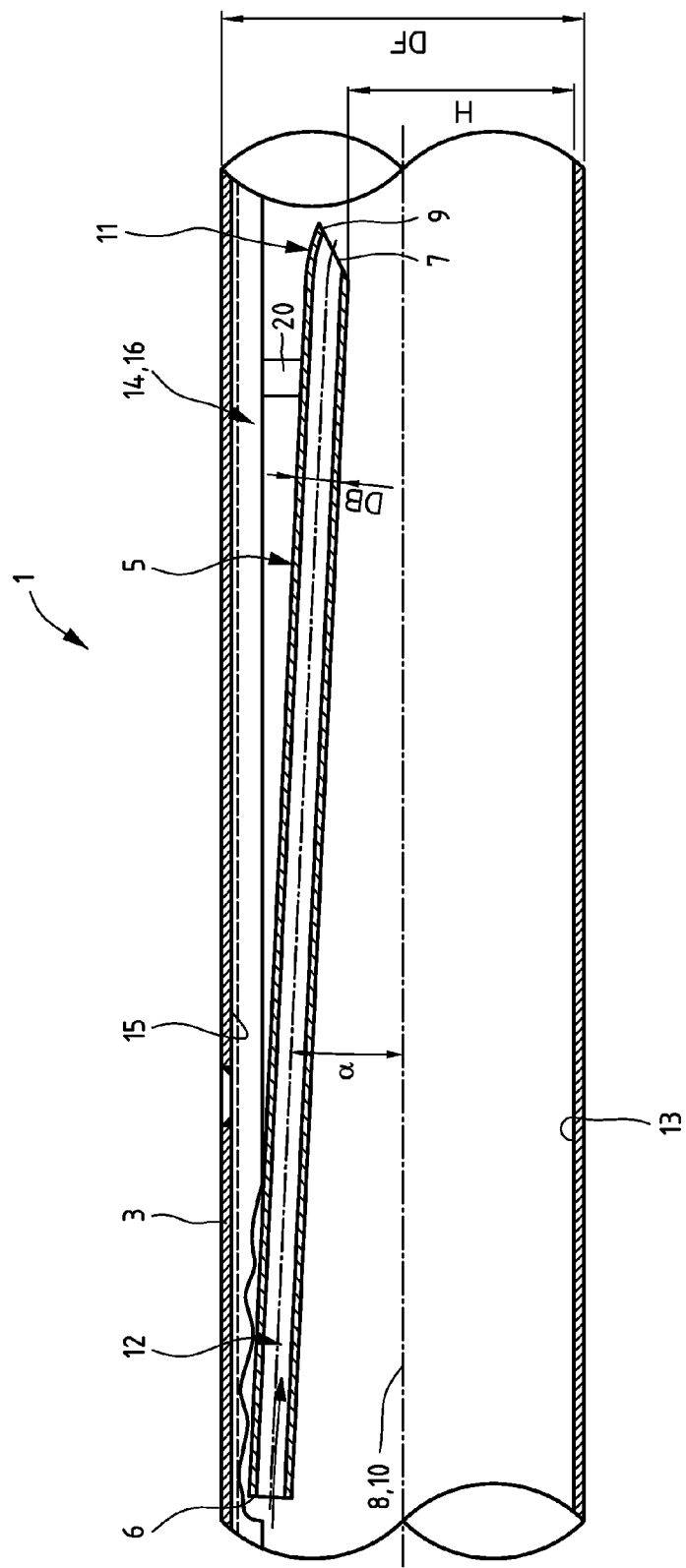
FIG. 1 shows a longitudinal section through a broken detail of a conveyor device with a main conveyor pipe shown axially area by area and a bypass conveyor pipe section arranged therein.
Figure 2:
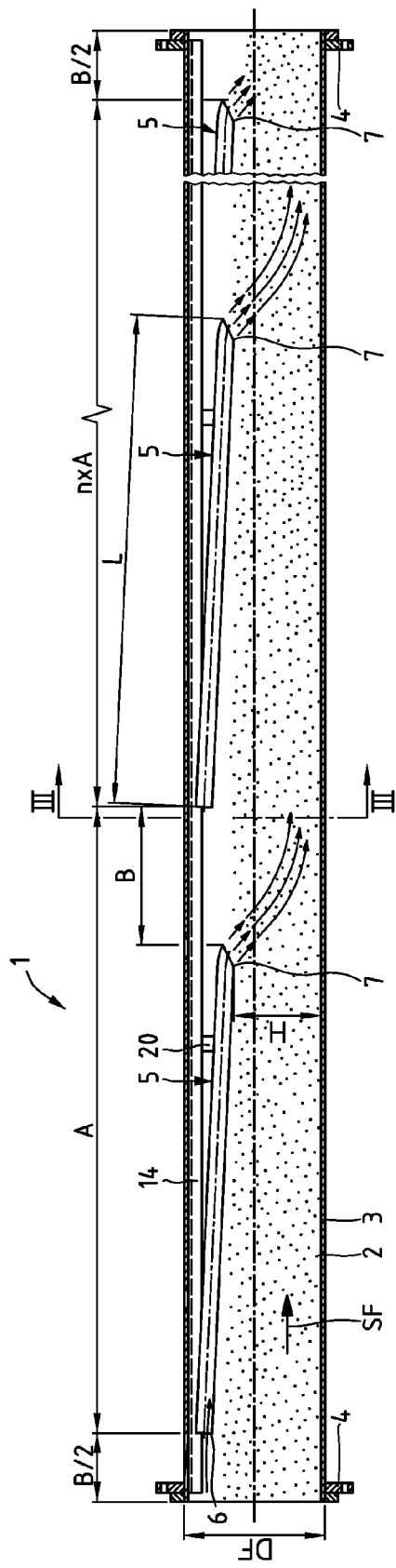
FIG. 2 shows a longitudinal section through the entire conveyor device with a plurality of bypass conveyor pipe sections, axially interrupted.

On the inlet side, in other words from the left in FIGS. 1 and 2, the main conveyor pipe 3 has a fluid connection with a conveyor gas source, not shown, of the conveyor system. The conveyor system has a supply device for the bulk material with a storage container, for example a mixer container which can be fed from above and a metering device, for example a cellular wheel sluice. Furthermore, the conveyor system has a supply device for the conveyor gas with the pressure conveyor gas source and an, in particular, controllable metering valve. At a feeding place, a bulk material line arranged downstream of the metering device opens into the main conveyor pipe 3 arranged downstream of the metering valve.

Bypass conveyor pipe sections 5 are arranged running inside the main conveyor pipe 3. The bypass conveyor pipe sections 5 are arranged inside the main conveyor pipe 3 at distances A one after the other. The spacing A is the distances of the bypass conveyor pipe sections 5 from the inlet opening 6 of one of the bypass conveyor pipe sections 5 up to the inlet opening 6 of the adjacent bypass conveyor pipe portion 5. Adjacent bypass conveyor pipe sections 5 are separated from one another by a free distance B. The bypass conveyor pipe sections 5 are pipe components which are separate from one another. A main extent direction of the bypass conveyor pipe sections 5 follows the main conveyor pipe 3.

When the conveyor device 1 is installed, in pipe regions of the main conveyor pipe 3 with a horizontal course component, the bypass conveyor pipe sections 5 of the configuration according to FIGS. 1 to 3 and 8 to 10 are arranged in an upper cross sectional area of the main conveyor pipe 3, as in particular shown in FIGS. 1 and 2. The cross section of the bypass conveyor pipe sections 5 is only a fraction of the cross section of the main conveyor pipe 3. The cross section of the bypass conveyor pipe sections 5 is generally less than a quarter of the cross section of the main conveyor pipe 3. The bypass conveyor pipe sections 5 have an external diameter DB.

Each of the bypass conveyor pipe sections 5 has an inlet opening 6 on the inlet side for conveyor gas to enter the bypass conveyor pipe portion 5. The bypass conveyor pipe sections 5 may be squeezed in the region of the main inlet opening 6 as the front view of FIG. 9 indicates. A stadium-shaped cross section AE of the inlet opening 6 is about 30 to 80% of the directly following round cross section DB (AB) of the bypass conveyor pipe portion 5. In the direction of a squeezing force, which, in the horizontal installed conveyor device 1 of the main conveyor pipe 3 corresponds to a vertical direction, the squeezed inlet opening 6 has an extent Q (cf FIG. 9).

At the end opposing the inlet opening 6, the bypass conveyor pipe section 5 has an outlet opening 7 for the conveyor gas to leave the bypass conveyor pipe section 5. The inlet opening 6 is further spaced apart from a central longitudinal axis 8 of the main conveyor pipe 3 than the outlet opening 7. The outlet opening 7, in the configuration according to FIGS. 1 and 2, is located above the longitudinal axis 8. A peripheral boundary 9 of the outlet opening 7 defining the outlet opening 7, which is simultaneously a wall portion of the bypass conveyor pipe section 5, encloses an angle $\gamma$ with the bypass conveyor pipe portion 5 in the area of its straight course (cf FIG. 8).

In general the inlet opening 6, when the main conveyor pipe 3 is installed, in main conveyor pipe segments with a horizontal course component of the main conveyor pipe 3, is arranged in a cross sectional portion of the main conveyor pipe 3, which is located above a cross sectional portion of the main conveyor pipe 3, in which the outlet 7 is arranged.

Each bypass conveyor pipe section 5 has a length L between the inlet opening 6 and the outlet opening 7.

The bypass conveyor pipe sections 5 in each case have a pipe course, which is straight adjacent to the inlet opening 6 and runs at an angle $\alpha$ to the central longitudinal axis 8. Adjacent to the outlet opening 7, the bypass conveyor pipe sections 5 have a pipe course, which is bent toward the central longitudinal axis, as is made clear, for example, in FIG. 1 by a bent portion 11 of a centre line 12 indicating the course of the bypass conveyor pipe portion 5. The bent portion 11 is bent with a radius of a curvature R (cf FIG. 8).

Because of the bend of the bypass conveyor pipe section 5, a tangent to an outer portion of the boundary 9 of the outlet opening 7 encloses with the centre line 12 of the area that runs straight of the bypass conveyor pipe portion 5, an angle $\beta$ (cf FIG. 8). If the bypass conveyor pipe portion does not have a region which runs straight on the inlet side, which is the case in some of the variants described below, the angle $\beta$ is defined between the above-mentioned tangent and a course of the centre line of the bypass conveyor pipe section in the area of the inlet opening 6. The angle $\beta$ is a measure of the bend of the bypass conveyor pipe section between the inlet opening 6 and the outlet opening 7.

The outlet opening 7 ends at a height H above a base 13 of the main conveyor pipe 3. The base 13 is in this case the peripheral portion of the main conveyor pipe 3 which, when the conveyor device 1 is installed, is arranged furthest down. The inlet openings 6 of the bypass conveyor pipe sections 5 are spaced further apart from the base 13 than the outlet openings 7.

The bypass conveyor pipe sections 5 are connected by a common bracket 14 to the main conveyor pipe 3. The bracket 14 is fixed, and in particular welded, to an inner wall 15 of the main conveyor pipe 3 opposing the pipe base 13, on the one hand, and to the bypass conveyor pipe sections 5, on the other hand. In the conveyor device 1 according to FIGS. 1 and 2, all the bypass conveyor pipe sections 5 are fixed by one and the same bracket 14 to the inner wall 15 of the main conveyor pipe 3.

The bracket 14 comprises an angular strut 16 with an equal-sided L-shaped cross section. In the section according to FIG. 3, in which the pipe base 13 is arranged at the bottom, the cross section of the angular strut 16 has the form of a pitched roof. A ridge of the angular strut 16 is welded to the inner wall 15 of the main conveyor pipe 3. Weld openings 17 are configured for this purpose in the main conveyor pipe 3. Free cross sectional ends 18 of the angular strut 16 are welded to an outer wall 19 of the bypass conveyor pipe portion 5 adjacent to the inlet opening 6.

Owing to the design of the bracket 14 with an open cross section, a further flow channel for the conveyor gas is formed in the region of the bracket 14, so a flow resistance by the bracket 14 is minimised.

A spacer 20 also belongs to the bracket 14. The latter is in each case arranged axially adjacent to the outlet opening 7 at the height of one of the bypass conveyor pipe sections 5. The spacer 20 is welded at one end to the bypass conveyor pipe section 5 and, at the other end, to the angular strut 16. The size of the angle $\alpha$ can be predetermined by means of the length of the spacer 20 and its axial position. One of the spacers 20 is associated with each bypass conveyor pipe section 5.

Located between the inlet opening 6 of the bypass conveyor pipe portion 5 leading in the flow direction SF (cf FIG. 2) of the conveyor gas and an inlet of the main conveyor pipe 3 is a spacing B/2, in other words half the free spacing B between the adjacent bypass conveyor pipe sections 5. A corresponding spacing B/2 is located between the outlet opening 7 of the last bypass conveyor pipe section 5 of the conveyor device 1 in the conveying direction SF (cf FIG. 2) and an outlet of the main conveyor pipe 3.

Figure 10:
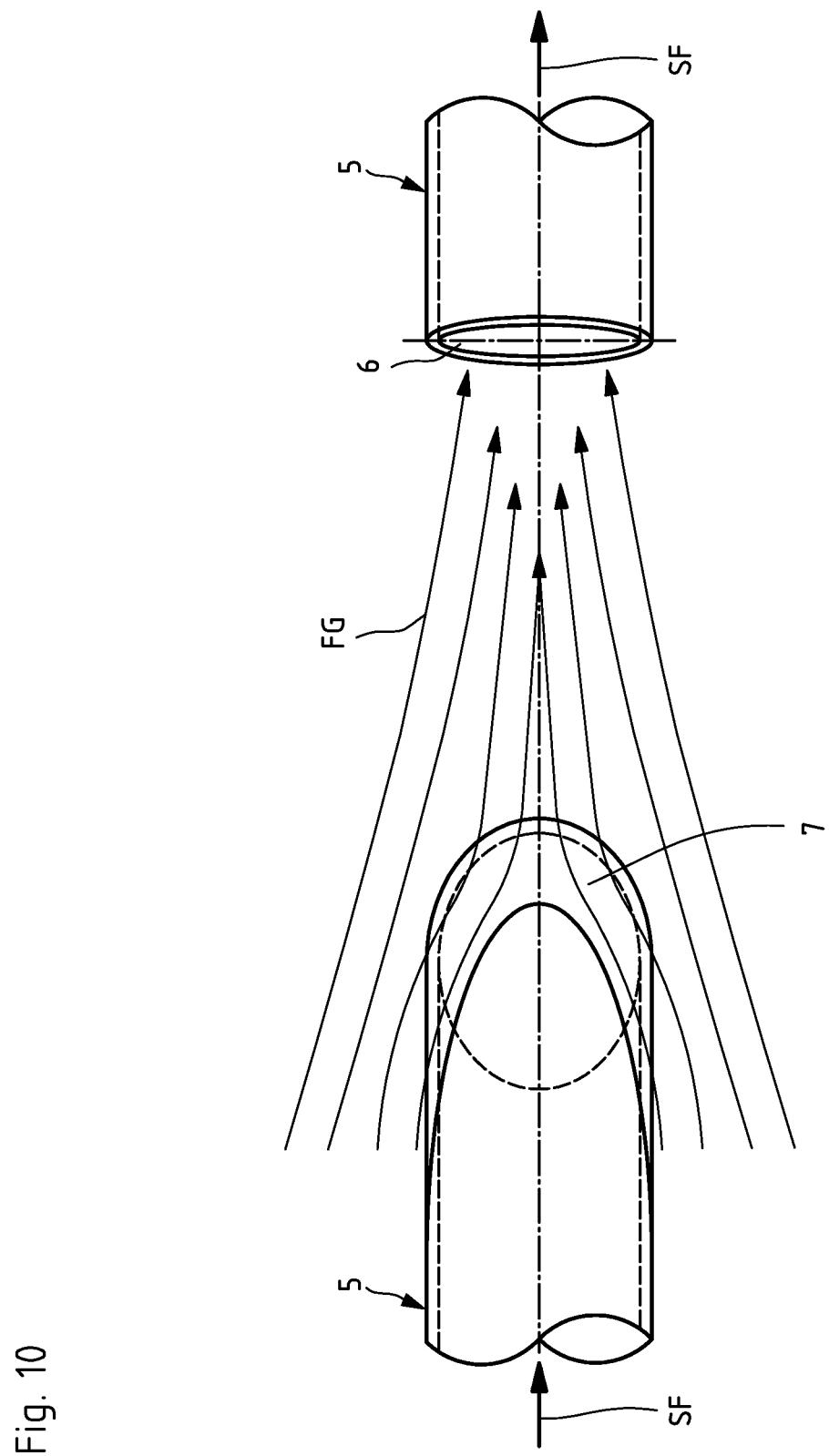
FIG. 10 shows a plan view of two adjacent bypass conveyor pipe sections shown in part in the surroundings of an intermediate space between these two bypass conveyor pipe sections.

FIG. 10 illustrates the flow conditions for the conveyor gas in the area between two bypass conveyor pipe sections 5 that are adjacent. Flow lines of the conveyor gas which also indicate the conveyor gas course in other figures of the drawing are designated FG in FIG. 10. Because of the configuration of the bypass conveyor pipe sections 5 in the area of the outlet opening 7, the conveyor gas flowing past on the outside of the bypass conveyor pipe section 5 shown on the left in FIG. 10 can be adequately deflected in the conveying course before the inlet opening 6 of the bypass conveyor pipe section 5 shown on the right in FIG. 10 into this inlet opening 6. A lee side of the outlet-side bypass conveyor pipe section 5 thus ends sufficiently before the inlet opening 6 of the next bypass conveyor pipe section 5. This favours the conveyor gas flow in the bypass conveyor pipe sections 5.

The bent configuration of the bypass conveyor pipe sections 5 in the area of the outlet openings 7 prevents the conveyor gas that is flowing through one of the bypass conveyor pipe sections 5, after leaving the outlet opening 7 thereof, from directly passing again into the next inlet opening 6 of the bypass conveyor pipe section 5 following next in the conveying direction SF. This ensures an intensive interaction of the conveyor gas with the bulk material 2 conveyed adjacent to the pipe base 13.

The conveyor device 1 works as follows: the bulk material 2 and the conveyor gas are fed on the input side into the conveyor device 1. The active and lasting flowing or swirling in of the conveyor gas via the outlet openings 7 leads to a constant fluidisation of the bulk material 2.

Depositing of the bulk material 2 in the area of the pipe base 13 and an undesired stopper or plug formation are thereby prevented. The fluidisation also prevents undesired high forces, otherwise caused by plugs, in the region of deflection bends of the conveyor system. The conveyor device 1 and other conveyor components of the conveyor system can then be fastened to a support frame by supports, which are correspondingly small in dimension, not shown in the drawing. Because of the conveyor gas guidance over the bypass conveyor pipe sections 5, a saving of conveyor gas of up to 50% can be achieved in comparison to the prior art. Conversely, with the same amount of a given conveyor gas quantity, a capacity increase of the conveyor system can be achieved with the conveyor device 1 while simultaneously avoiding high pressure peaks, which would otherwise result in undesired plug formation. The conveyor device 1 provides the possibility of utilising a higher conveyor gas pressure level without other conveyor gas sources thus having to be used. A pressure drop of the conveyor gas along the conveyor device 1 is also small. The conveyor gas guided via the bypass conveyor pipe sections 5, when there is an interruption of a bulk material supply, also allows the conveyor device 1 to be efficiently blown free. Deposits of the bulk material 2 present in the main conveyor pipe 3 and also in the bypass conveyor pipe sections 5 can then be blown out.

A powdery bulk material can be used as the bulk material 2, which is provided in the mineral material industry and in the plastics industry. Alumina, fly ash, chalk and PTA (terephthalic acid) can be conveyed, in particular, as the bulk material 2.

Dimension ratios of the conveyor device 1 will be discussed below:

A ratio DF/DB between a diameter DF of the main conveyor pipe 3 and a diameter DB of the bypass conveyor pipe sections 5 may be in the range between 1.5 and 15 and may be in the range between 4 and 12.

A ratio L/DF between the length of the bypass conveyor pipe sections 5 and the diameter of the main conveyor pipe 3 may be in the range between 0.5 and 7 and may be in the range between 2 and 5.

A ratio A/DB between the spacing of the bypass conveyor pipe sections 5 from inlet opening 6 to inlet opening 6 and the external diameter of the bypass conveyor pipe sections 5 may be in the range between 5 and 70 and may be in the range between 10 and 50.

A ratio B/DB of the free spacing between the bypass conveyor pipe sections 5 and the external diameter of the bypass conveyor pipe sections 5 may be in the range between 1 and 20 and may be in the range between 2 and 15.

A ratio AE/DB may be in the range between 0.1 and 1 and may be in the range between 0.3 and 0.9, The angle $\alpha$ may be in the range between 0° and 60° and may be in the range between 1° and 12°.

The angle $\beta$ may be in the range between 0° and 90° and may be in the range between 5° and 40°.

The angle $\gamma$ may be in the range between 0° and 90° and may be in the range between 3° and 60°.

A ratio H/DF of the height of the outlet opening 7 over the pipe base 13 to the external diameter of the main conveyor pipe 3 may be in the range between 0 and 0.9 and may be in the range between 0.3 and 0.8.

A ratio R/DB between the radius of curvature of the bent portion 11 and the external diameter of the bypass conveyor pipe section 5 may be in the range between 0.5 and 10 and may be in the range between 1 and 4.

With bulk materials which are easy to fluidise and do not tend to plug formation, the length L of the bypass conveyor pipe section 5 may also be shorter than that corresponding to the ratio L/DF mentioned above. In this case, the length L may be so short that the inlet opening 6 is located very close to the outlet opening 7. The length L may, in particular, be so short that the bypass conveyor pipe section 5 is only insignificantly longer than an extent of the outlet opening 7 along the main conveyor pipe 3. In this case, the ratio L/DF is significantly smaller than 1.

Figure 3:
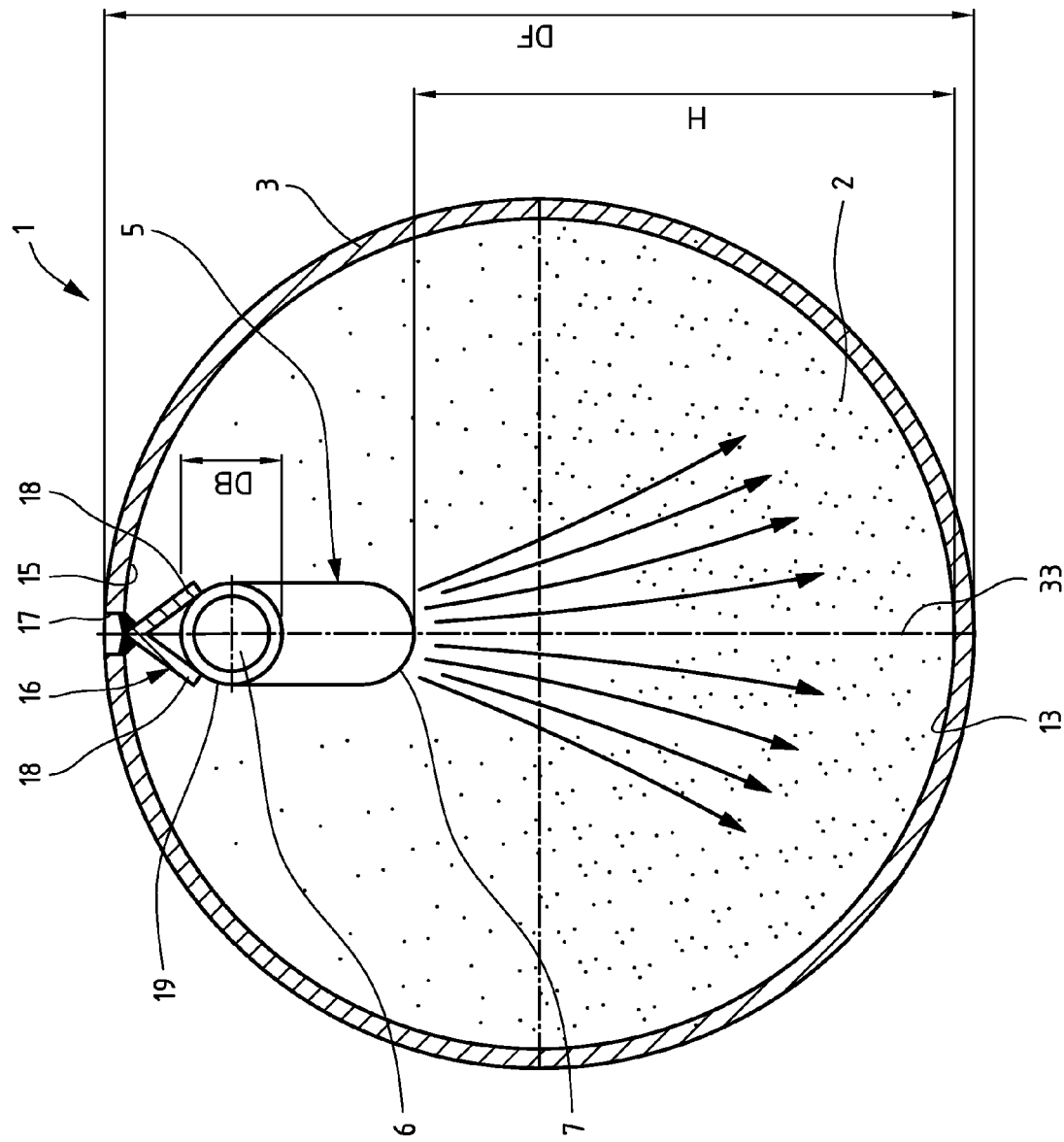
FIG. 3 shows a cross section along the line III-III in FIG. 2.
Figure 4:
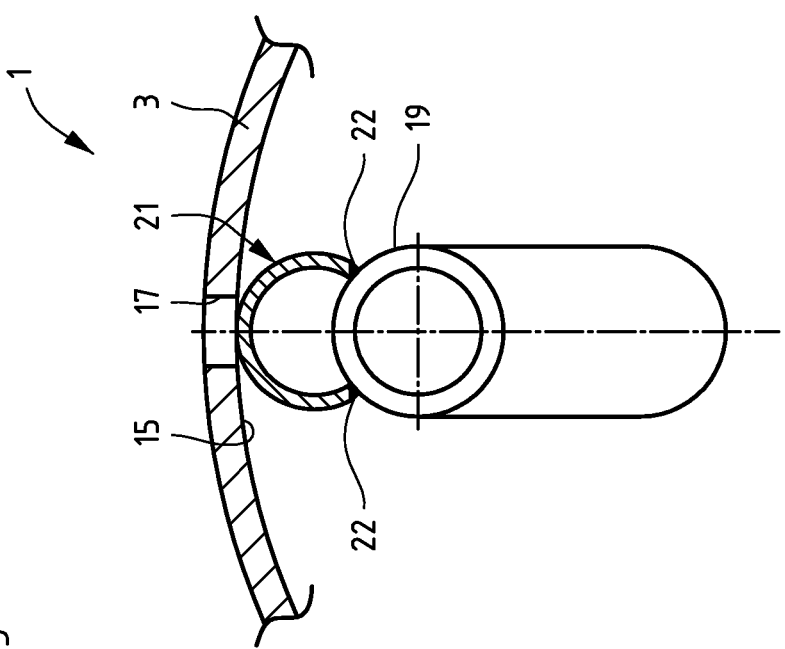
FIG. 4 shows, in a view similar to FIG. 3 but only showing the main conveyor pipe detail-wise, a variant of a bracket for the bypass conveyor pipe section on an inner wall of the main conveyor pipe.
Figure 7:
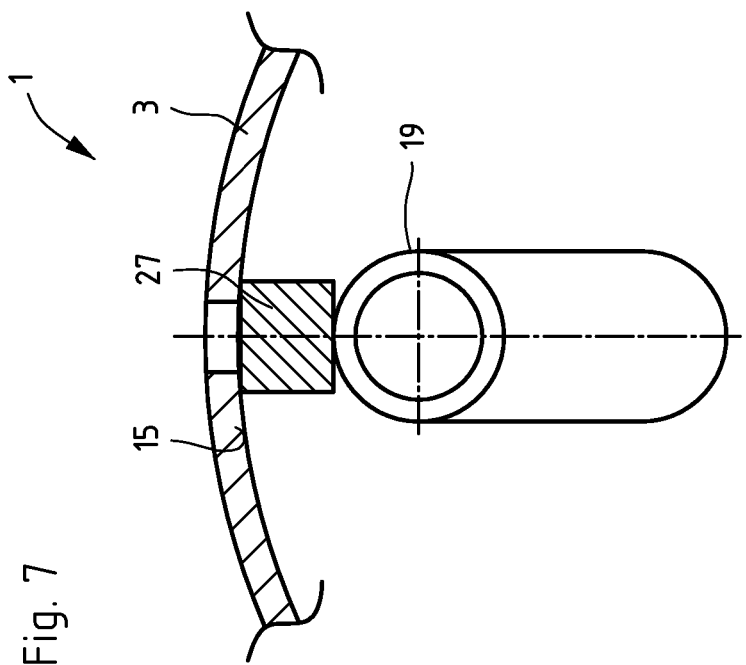

With the aid of FIGS. 4 and 7, further configurations of a bracket are described, which can be used instead of the bracket 14 of the configuration according to FIGS. 1 to 3. Components which correspond to those which have already been described above with reference to FIGS. 1 to 3 and 8 to 10, have the same reference numerals and will not be described again in detail.

In the embodiment according to FIG. 4, a bracket 21 is designed with a bent cross section in the form of a semi circle. The bent cross section of the bracket 21 opens toward the bypass conveyor pipe section 5. The bracket 21 is welded in the region of the inlet opening 6 by free end edges 22 of the bent cross section to the outer wall 19 of the bypass conveyor pipe section 5. The bracket 21 is welded in the region of the apex of the bend cross section to the inner wall 15 of the main conveyor pipe 3.

Figure 5:
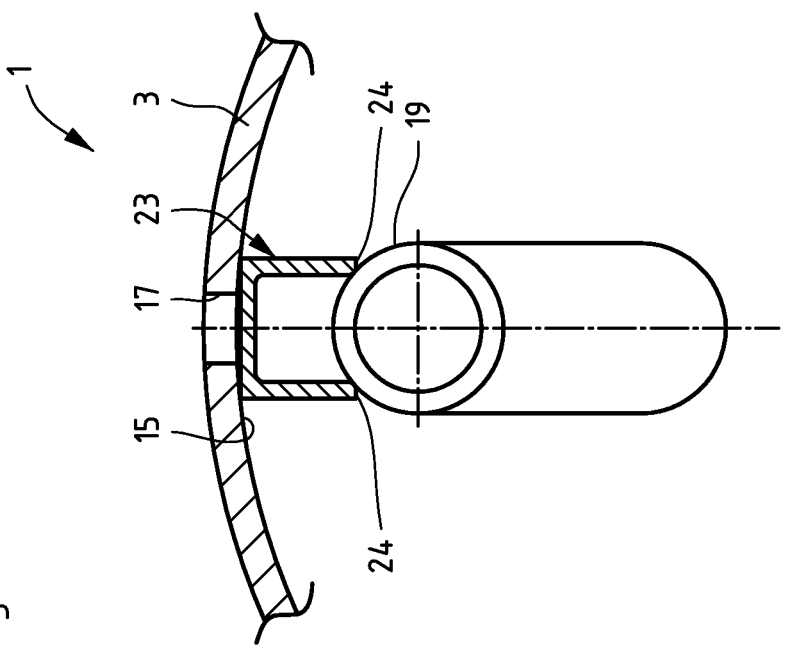
FIGS. 5 to 7 show further bracket variants in a view similar to FIG. 4.

A bracket 23 according to FIG. 5 has an open rectangular cross section, in other words a U-shaped cross section, which is open at the bottom. The bracket 23 is welded to the outer wall 19 of the bypass conveyor pipe section 5 in the region of free end edges 24. A base leg of the U-shaped cross section of the bracket 23 is welded to the inner wall 15 of the main conveyor pipe 3.

Figure 6:
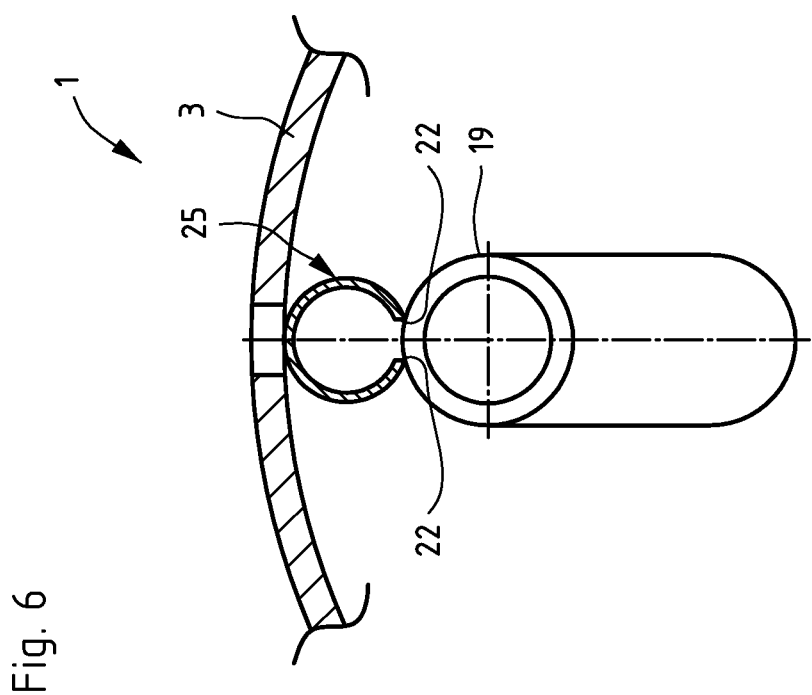

A bracket 25 according to FIG. 6 corresponds to the bracket 21 according to FIG. 4 with the difference that a bent cross section of the bracket 25 covers about ⅚ of a full circle.

A bracket 27 according to FIG. 7 is configured as a rod made of a rectangular solid material. A lower side wall of the bracket 27 in FIG. 7 is welded to the outer wall 19 of the bypass conveyor pipe section 5 and an upper side wall of the bracket 27 in FIG. 7 is welded to the inner wall 15 of the main conveyor pipe 3.

A further embodiment of bypass conveyor pipe sections for the conveyor device 1 will be described below with the aid of FIG. 11. Components which correspond to those which have already been described above with reference to FIG. 1 to 10 have the same reference numerals and will not be described again in detail.

Figure 11:
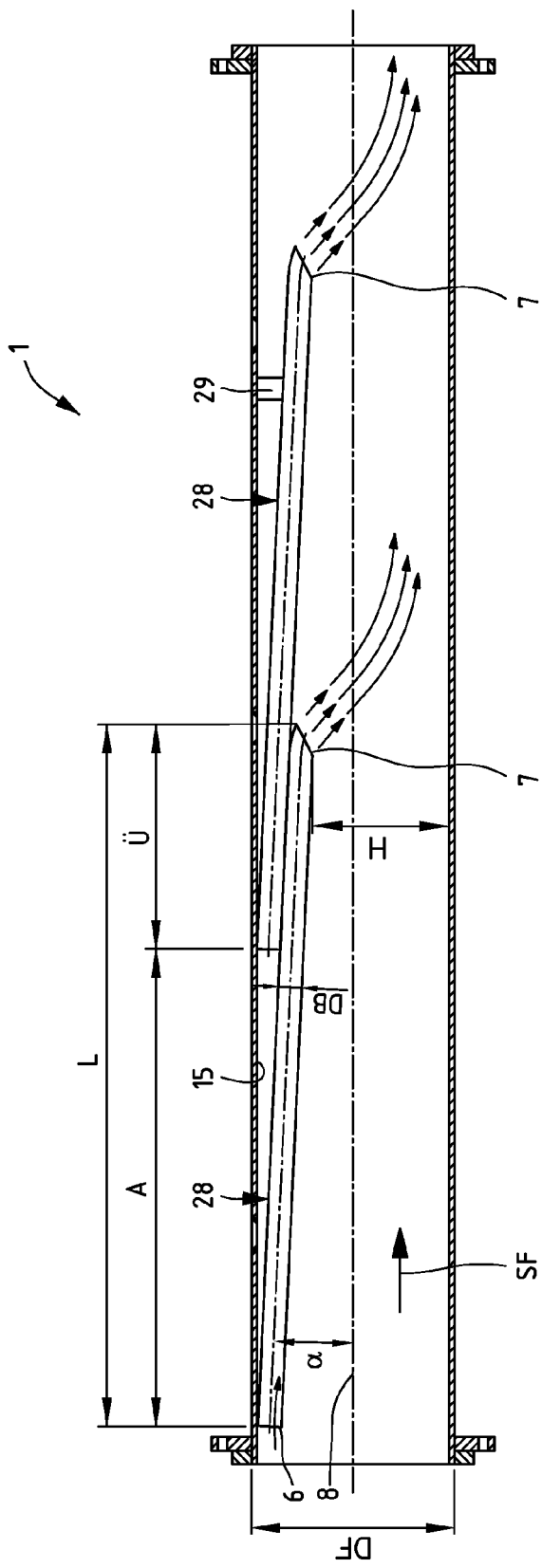
FIG. 11 shows in a view similar to FIG. 2, a further embodiment of a conveyor device.

In the arrangement of bypass conveyor pipe sections 28 according to FIG. 11, there is no free spacing B between adjacent bypass conveyor pipe sections 28, but adjacent bypass conveyor pipe sections 28 are arranged overlapping one another axially with an overlap or overlapping length Ü in the main conveyor pipe 3. In their basic configuration with a straight pipe course adjacent to the inlet opening 6 and a bent pipe course adjacent to the outlet opening 7 toward the central longitudinal axis 8, the bypass conveyor pipe sections 28 correspond to the bypass conveyor pipe sections 5 of the configurations according to FIGS. 1 to 10. The angle α in the arrangement according to FIG. 11 is slightly smaller than in the arrangement according to FIG. 1. The bypass conveyor pipe sections 5, which overlap in the region of the outlet opening 7 with an adjacent bypass conveyor pipe section 28, are connected in the region of the outlet opening 7 by means of this bypass conveyor pipe section 5 to the inner wall 15 of the main conveyor pipe 3. For this purpose, this adjacent bypass conveyor pipe section 28, on the one hand, is welded to the bypass conveyor pipe section 28 in the region of the outlet opening 7 and, on the other hand, welded to the inner wall 15. A spacer 29 in the manner of the spacer 20 of the configuration according to FIG. 1 to fasten the bypass conveyor pipe section 5 in the region of the outlet opening 7 is only necessary for the last bypass conveyor pipe section 5 in the bulk material conveying direction SF.

A ratio Ü/DB of the overlap between the adjacent bypass conveyor pipe sections 28 and the external diameter of the bypass conveyor pipe sections 28 may be in the range between 1 and 30, may be in the range between 1.5 and 20 and, in particular, in the range between 2 and 10.

A degree of overlap Ü/L, in other words a ratio between the overlap length Ü and the length L of the bypass conveyor pipe section 28, may be in the range between 1/20 and 1/3.

Figure 12:
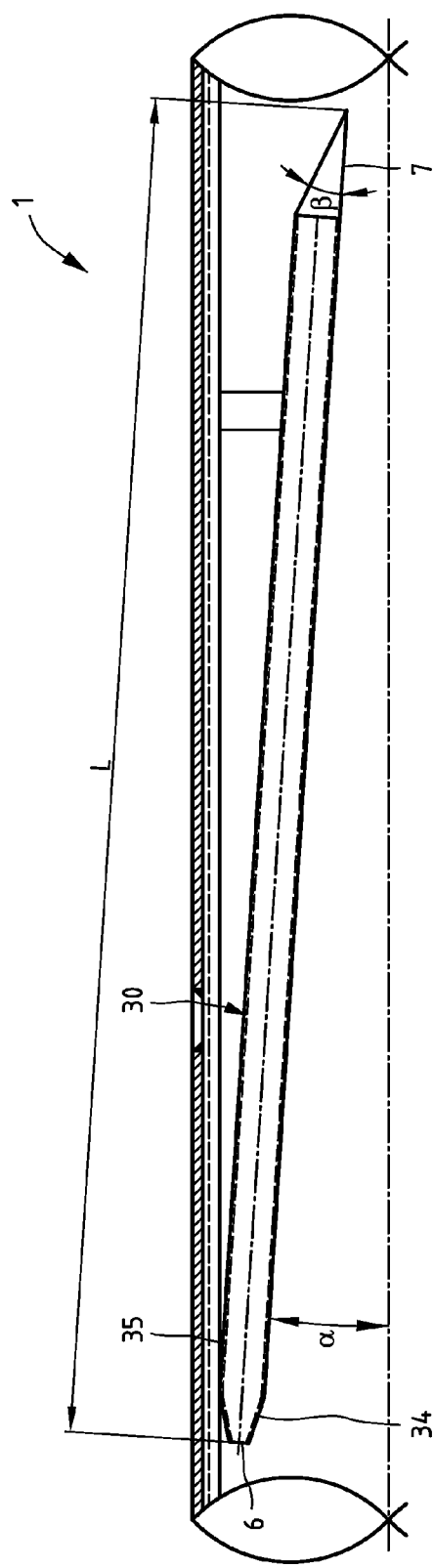
FIG. 12 shows, in a view similar to FIG. 1, the main conveyor pipe additionally radially cut, only in part, in a further configuration of a bypass conveyor pipe section.
Figure 13:
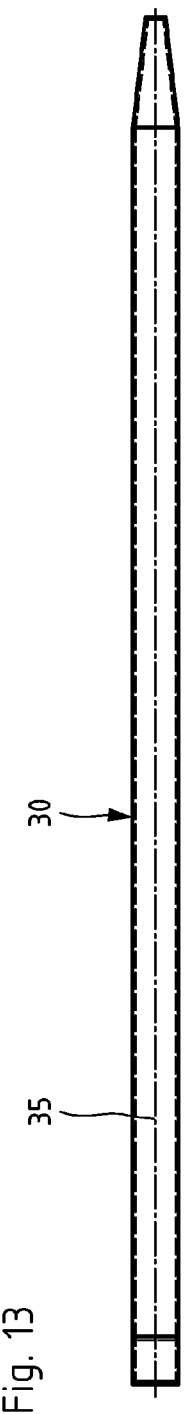
FIG. 13 shows a plan view of the bypass conveyor pipe section according to FIG. 12.
Figure 14:
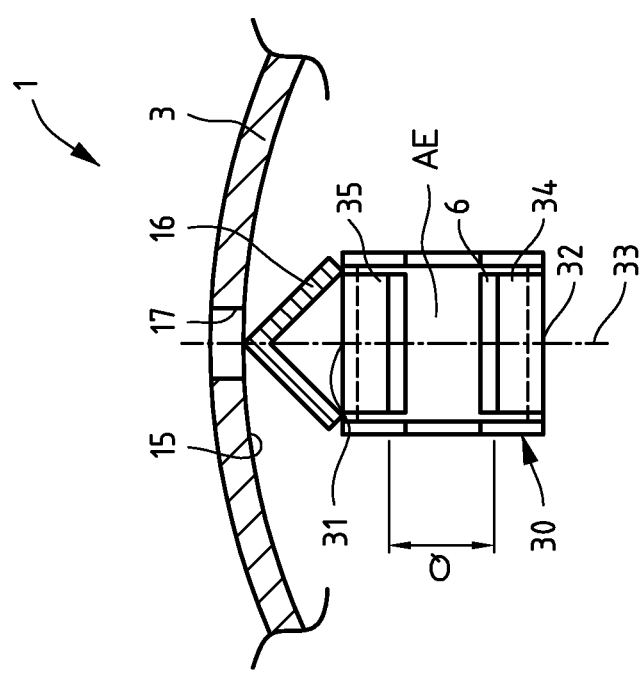
FIG. 14 shows, in a view similar to FIGS. 4 to 7, the conveyor device with the bypass conveyor pipe section according to FIGS. 12 and 13.

A further configuration of bypass conveyor pipe sections for the conveying device 1 is described with the aid of FIGS. 12 to 14. Components which correspond to those which have already been described above with reference to FIGS. 1 to 10 have the same reference numerals and will not be discussed again in detail.

A bypass conveyor pipe section 30, in the configuration of the conveyor device 1 according to FIGS. 12 to 14, has a rectangular cross section.

The arrangement of the rectangular bypass conveyor pipe section 30 in the main conveyor pipe 3 is such that two side half bisectors 31, 32 of the rectangular cross section are located on a vertical centre plane 33 of the main conveyor pipe 3, which is simultaneously an axis of mirror symmetry of the conveyor device 1 running along the main conveyor pipe 3, according to FIGS. 12 to 14.

A base wall 34 and a top wall 35 of the bypass conveyor pipe section 30 are bent toward one another in the area of the inlet opening 6 so the inlet opening 6, comparably with the squeezed inlet openings 6 of the configurations according to FIGS. 1 to 11, is reduced with respect to its cross section AE relative to the remaining rectangular cross section of the bypass conveyor pipe section 30.

In the region of the outlet opening 7, the bypass conveyor pipe section 30 is designed with wall elements arranged conically tapering. The outlet opening 7 has a cross section which is trapezoidal overall.

The bypass conveyor pipe section 30 is fixed by means of a bracket to an angular strut in the manner of the angular strut 16 of the configuration according to FIGS. 1 to 3 to the inner wall 15 of the main conveyor pipe 3.

A further configuration of bypass conveyor pipe sections for the conveyor device 1 will be described below with the aid of FIG. 15. Components which correspond to those which have already been described above with reference to FIGS. 1 to 10 have the same reference numerals and will not be discussed again in detail.

Figure 15:
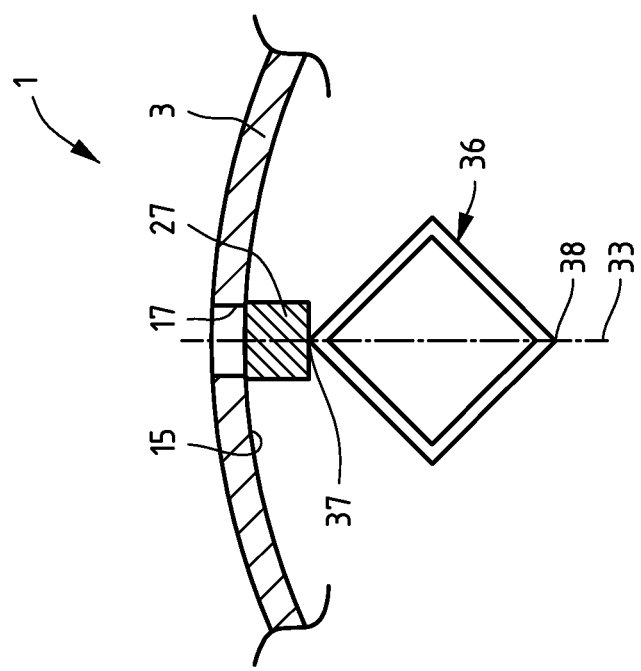
FIG. 15 shows, in a view similar to FIG. 14, a conveyor pipe device with a further variant of a cross section for a bypass conveyor pipe section.

A bypass conveyor pipe section 36 of the conveyor device 1 according to FIG. 15 also has a rectangular cross section. The arrangement of the bypass conveyor pipe section 36 in the main conveyor pipe 3 is such that two corners 37, 38 of the bypass conveyor pipe section 36 are located on the centre plane 33 of the main conveyor pipe 3. The rectangular, square cross section of the bypass conveyor pipe section 36 also lies in the manner of a rhombus in the main conveyor pipe 3. The bypass conveyor pipe section 36 is fixed by means of the corner 37 by a bracket in the manner of the bracket 27 of the configuration according to FIG. 7 on the inner wall 15 of the main conveyor pipe 3.

A further configuration of bypass conveyor pipe sections for the conveyor device 1 will be described below with the aid of FIG. 16. Components which correspond to those which have already been described above with reference to FIGS. 1 to 10 have the same reference numerals and will not be discussed again in detail.

A bypass conveyor pipe section 39 of the conveyor device 1 according to FIG. 15 extends straight as a whole between the inlet opening 6 and the outlet opening 7, in other words does not have a bend or a kink in the region of the outlet opening 7.

Figure 16:
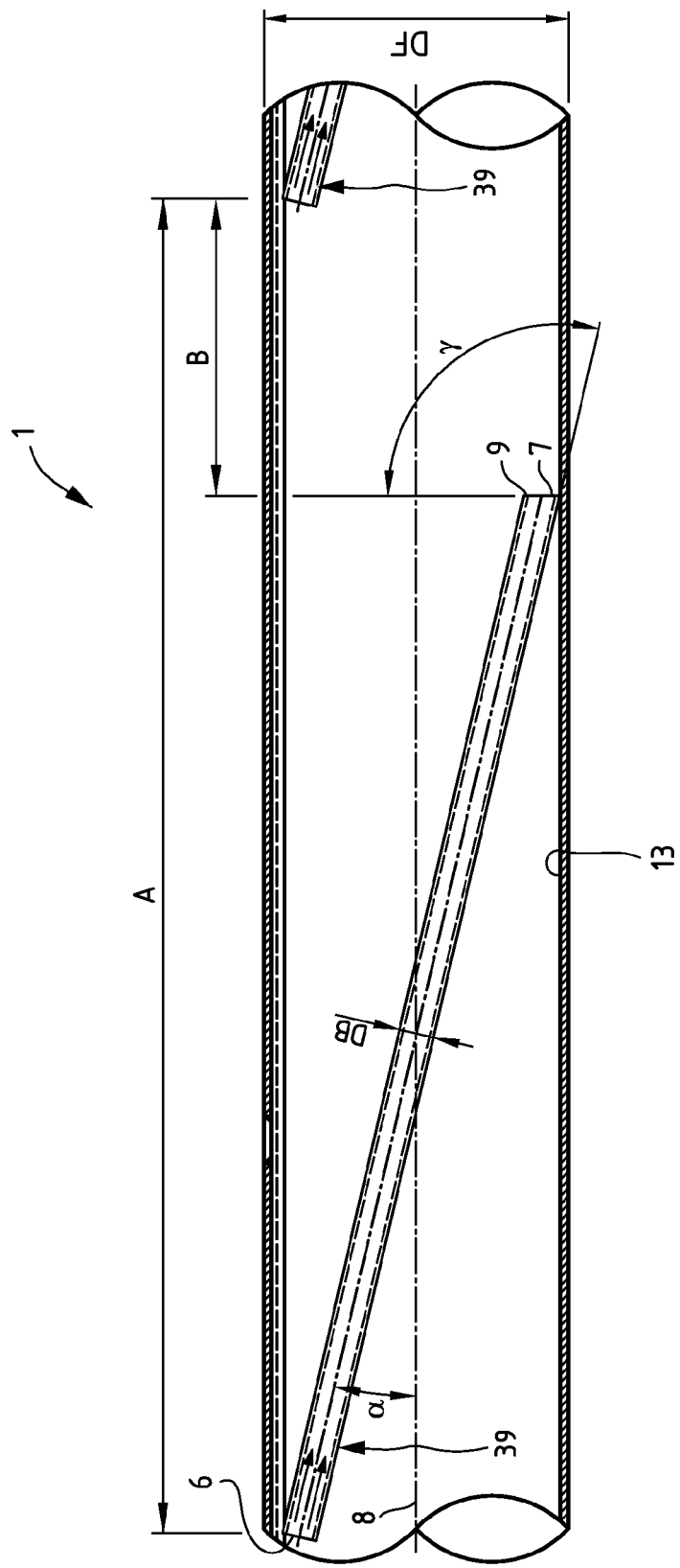
FIGS. 16 and 17 show, in a view similar to FIG. 2, further configurations of a conveyor device.

The angle γ between the plane predetermined by the limitation 9 and the course of the bypass conveyor pipe section 5 in the configuration according to FIG. 16 is greater than 90°. There applies approximately: γ=90°+α, so the plane predetermined by the limitation 9 of the outlet opening 7, with the longitudinal axis 8, encloses a right angle.

The outlet opening 7 in the bypass conveyor pipe section 5 ends directly over the pipe base 13. In the region of the outlet opening 7, the bypass conveyor pipe section 5 can be fixed to the pipe base 13 and be welded thereto, in particular.

In the embodiment according to FIG. 16, there thus applies: H=0.

A further embodiment of bypass conveyor pipe sections for the conveyor device 1 will be described below with the aid of FIG. 17. Components which correspond to those which have already been described above with reference to FIGS. 1 to 10 have the same reference numerals and will not be discussed again in detail.

Figure 17:
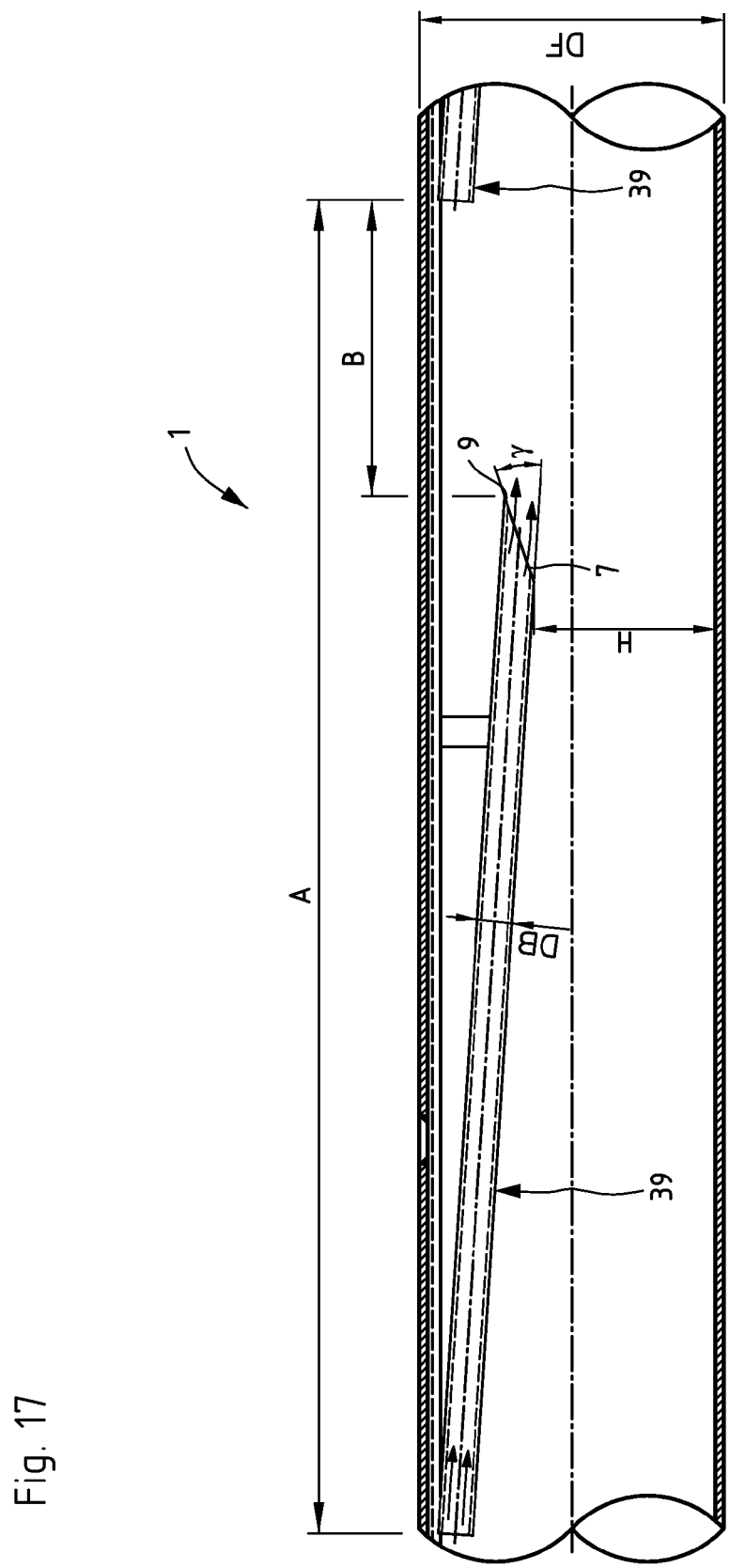

A bypass conveyor pipe section 40, in the configuration of the conveyor device 1 according to FIG. 17, also runs straight, in other words not bent or kinked. The angle γ between the plane predetermined by the limitation 9 of the outlet opening 7 and the course of the bypass conveyor pipe section 40 is approximately 30° in the configuration according to FIG. 17. The height H in the embodiment according to FIG. 17 is slightly greater than half the external diameter DF of the main conveyor pipe 3.

In the embodiment according to FIG. 16, the angle γ between the plane predetermined by the limitation 9 and the course of the bypass conveyor pipe section 39 may be in the range between 45° and 150°, may be in the range between 80° and 130° and may, in particular, be in the range between 90° and 120°.

In the embodiment according to FIG. 17, the angle γ between the plane predetermined by the limitation 9 and the course of the bypass conveyor pipe section 39 may in the range between 10° and 100°, may be in the range between 15° and 70° and may, in particular, be in the range between 20° and 50°.

A further configuration of bypass conveyor pipe sections for the conveyor device 1 will be described below with the aid of FIG. 18. Components which correspond to those which have already been described above with reference to FIGS. 1 to 10 have the same reference numerals and will not be discussed again in detail.

Figure 18:
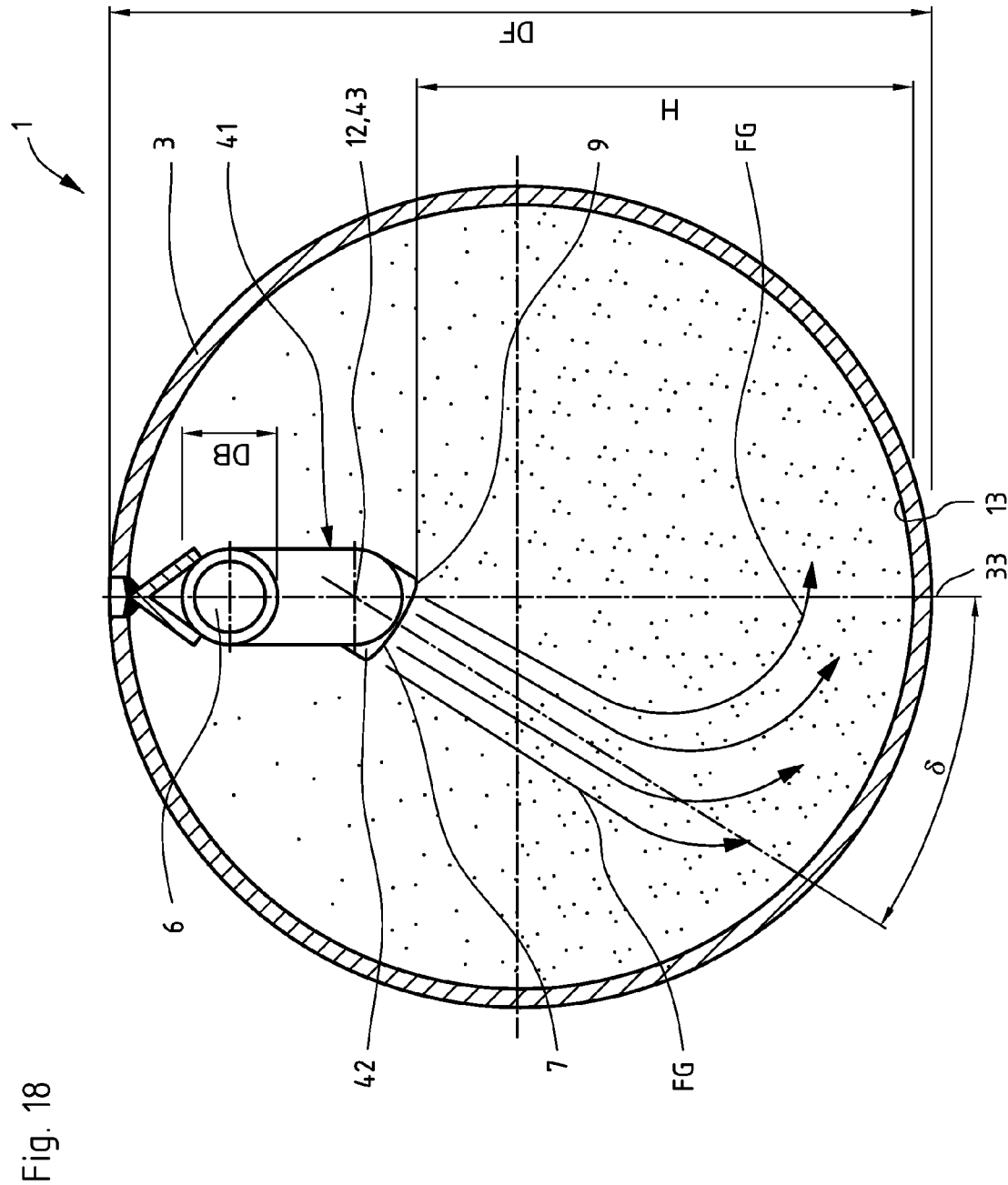
FIG. 18 shows, in a view similar to FIG. 3, a further configuration of a conveyor device with an angled outlet pipe segment.

In contrast to all the embodiments described until now, a bypass conveyor pipe section 41 in the configuration according to FIG. 18 is not designed mirror-symmetrically with respect to the vertical centre plane 33 of the main conveyor pipe 3. An outlet pipe region 42 of the bypass conveyor pipe section 41 is pivoted about a pipe axis 43 of the bypass conveyor pipe section 5, which extends along the straight centre line 12 (cf the configuration according to FIG. 1), by an angle δ relative to the vertical centre plane 33.

The angle δ may be in the range between 0° and 130°, may be in the range between 10° and 90° and, in particular, in the range between 20° and 50°.

The outlet opening 7 of the bypass conveyor pipe section 5 is spaced apart from the pipe axis 43.

Because of the pivoting angle δ and the lateral blowing out of the conveyor gas required as a result, an initially helical conveyor gas guidance, which is indicated in FIG. 18 by direction arrows FG, is produced in interaction with the gravitational force. Owing to this swirl during the conveyor gas guidance, a depositing of the bulk material in the area of the pipe base 13 is additionally reduced or prevented.

In the conveying direction, the pivoting angle δ may be oriented in the clockwise direction, as shown in FIG. 18, or anti-clockwise. All the bypass conveyor pipe sections 42 of the conveyor device 1 according to FIG. 18 may have a pivoting angle δ which is identical and identically oriented.

Configurations of the conveyor device 1 with a pivoted outlet pipe region with different pivoting angles δ and also with different pivot orientations, in particular with alternating pivoting in the clockwise direction and anti-clockwise direction may also be used.

With the aid of FIGS. 19 and 20, a further configuration of a bypass conveyor pipe section 44 for the conveyor device 1 will be described below. Components which correspond to those which have already been described above with reference to FIGS. 1 to 18 have the same reference numerals and will not be discussed again in detail.

Figure 19:
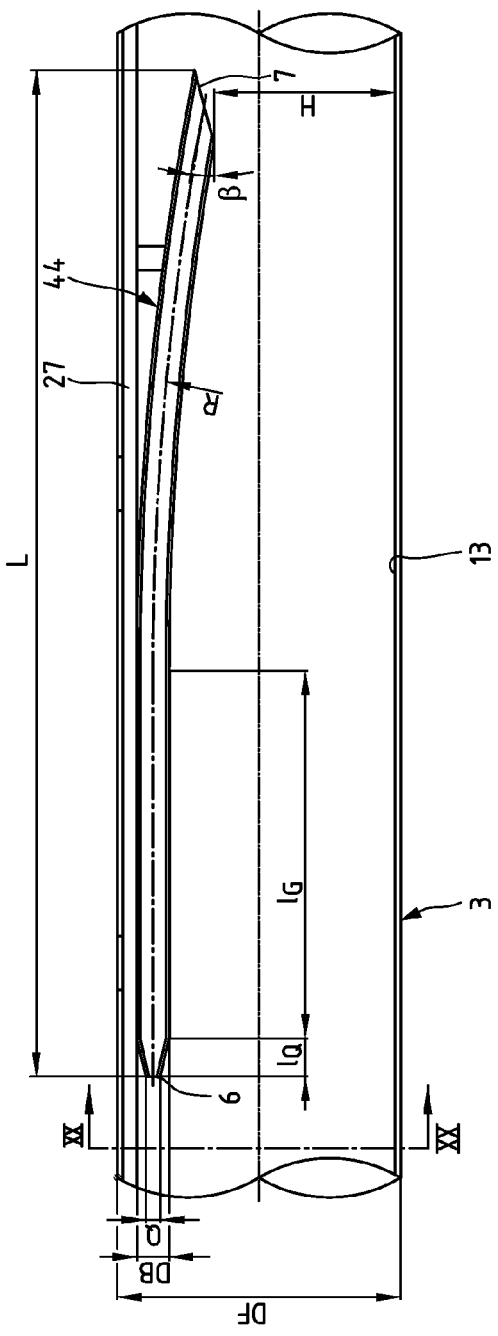
FIG. 19 shows, in a view similar to FIG. 1, a further configuration of a bypass conveyor pipe section.

The bypass conveyor pipe section 44 according to FIG. 19 is configured squeezed similar to the embodiment according to FIGS. 8 and 9 in the area of the inlet opening 6. A longitudinal extent of this area of the bypass conveyor pipe section 44 which is squeezed on the inlet side is designated $l_Q$ in FIG. 19. A straight section of the bypass conveyor pipe section 44 with a length $l_G$ adjoins this. A section of the bypass conveyor pipe section 44, which is bent with a radius R and with a length $L-(l_G+l_Q)$ adjoins this, L being the total length of the bypass conveyor pipe section 44. The angle β in the configuration according to FIG. 19 may be in the range between 10° and 80° and may be in the range between 15° and 60°. The ratio $l_G/L$ in the configuration according to FIG. 19 may be in the range of 1/10 to 1/1.5. The ratio $l_G/L$ may be in the range between 0.15 and 0.4. Corresponding ratios result on the length of the bent region in relation to the total length of the bypass conveyor pipe section 44. The bending radius R may be in the range of 0.2 to 1.5 times the length L of the bypass conveyor pipe section 44.

In the configuration according to FIG. 19, the outlet opening 7 ends at a height H above the pipe axis 8 of the main conveyor pipe 3. The ratio H/DF in the configuration according to FIG. 19 may be in the range between 0.2 and 0.8.

A further configuration of bypass conveyor pipe sections 45 for the conveyor device 1 will be described below with the aid of FIG. 21. Components which correspond to those which have already been described above with reference to FIGS. 1 to 20, in particular with reference to FIGS. 19 and 20, have the same reference numerals and will not be discussed again in detail.

Figure 20:
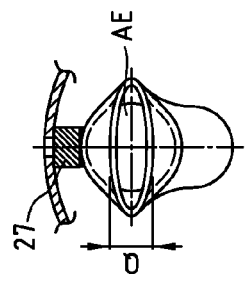
FIG. 20 shows a section along the line XX-XX in FIG. 19.
Figure 21:
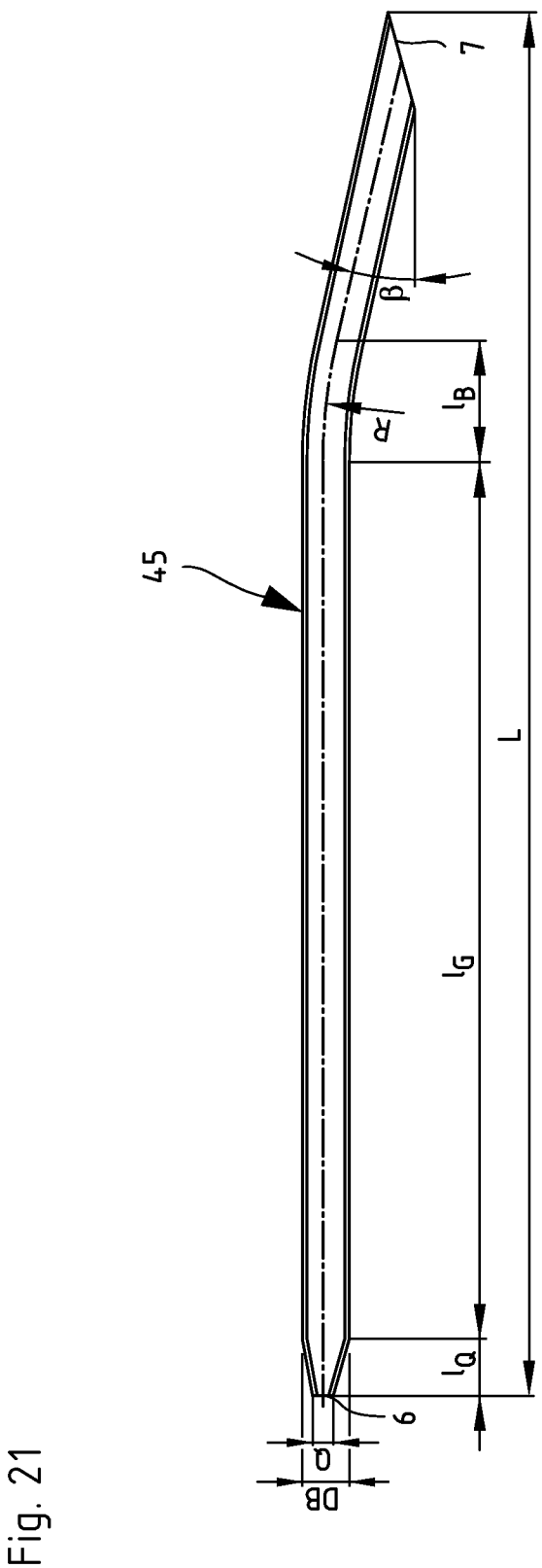
FIGS. 21 and 22 show further variants of bent bypass conveyor pipe sections which can be used instead of the bent bypass conveyor pipe section of the variant according to FIG. 19.

In contrast to the configuration according to FIGS. 19 and 20, the bypass conveyor pipe section 45 between the straight region with the length $l_G$ and the outlet opening 7 is not bent overall, but in turn divided into a bent region with the length $l_B$, which directly adjoins the straight region $l_G$ on the inlet side, and second straight region adjoining the bent region on the outlet side up to the outlet opening 7. The bypass conveyor pipe section 45 in its course between the inlet opening 6 and the outlet opening 7, in other words firstly has a squeezed pipe section with the length $l_Q$, then a straight pipe section with the length $l_G$, then a bent pipe section with the length $l_B$ and then in turn a straight pipe section. In the configuration according to FIG. 21, the ratio $l_G/L$ is about 0.2 to 0.8. The ratio $l_B/L$ may, for example, be in the range between 0.2 and 0.6. The length of the straight region on the outlet side of the bypass conveyor pipe section 45 is between 0.5 and 2 times the length $l_B$.

The angle β in the bypass conveyor pipe section 45 is 10° to 60°. The ratio R/L is 0.2 to 1.5.

Figure 22:
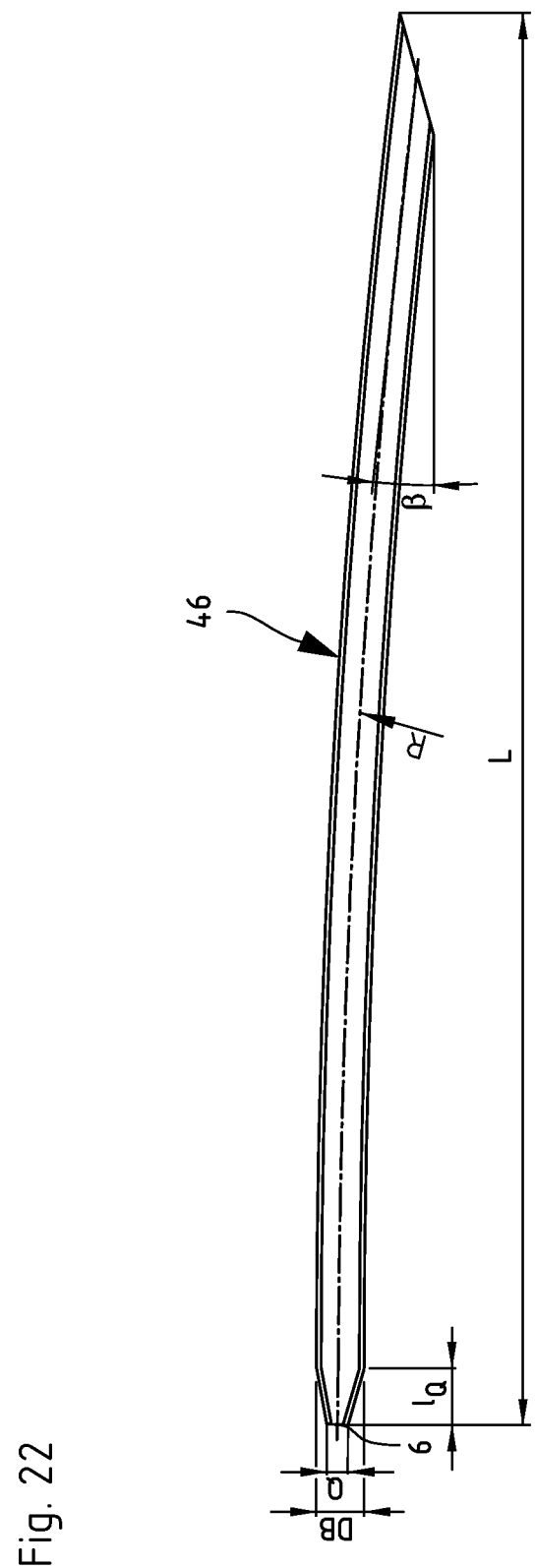

With the aid of FIG. 22, a further configuration of bypass conveyor pipe sections 46 for the conveyor device 1 will be described below. Components which correspond to those which have already been described above with reference to FIGS. 1 to 20, in particular with reference to FIGS. 19 and 20, have the same reference numerals and will not be discussed again in detail.

The bypass conveyor pipe section 46 after the squeezed region on the inlet side, with a length $l_Q$, is bent as a whole. The angle β may be between 5° and 60°. The ratio R/L is about 0.5 to 3.

What is claimed is:

1. A conveyor device (1) for pneumatically conveying bulk material, comprising:
    a main conveyor pipe (3),
    a plurality of bypass conveyor pipe sections (5; 28; 30; 36; 39 to 41; 44 to 46), which are separate from one another, arranged one behind the other within the main conveyor pipe (3) and the main extent direction of which runs along the main conveyor pipe (3), each of said plurality of bypass conveyor pipe sections comprising:
        an inlet opening (6) for conveyor gas to enter the bypass conveyor pipe section (5; 28; 30; 36; 39 to 41; 44 to 46), and
        a stadium-shaped outlet opening (7) for the conveyor gas to leave the bypass conveyor pipe section (5; 28; 30; 36; 39 to 41; 44 to 46),
    wherein when the main conveyor pipe (3) is installed, in main conveyor pipe segments with a horizontal course component of the main conveyor pipe (3), the inlet opening (6), is arranged in a cross sectional portion of the main conveyor pipe (3), which is located above a cross sectional portion of the main conveyor pipe (3), in which the outlet opening (7) is arranged.

2. A conveyor device according to claim 1, further comprising a bypass conveyor pipe section (5; 28; 30; 36), having a straight pipe course, at least adjacent to the inlet opening (6), and which runs at an angle (α) to a central longitudinal axis (8) of the main conveyor pipe (3).

3. A conveyor device according to claim 1, further comprising a bypass conveyor pipe section (5; 28; 44; 46), having a pipe course which, adjacent to the outlet opening (7), is bent toward a pipe base (13) of the main conveyor pipe (3).

4. A conveyor device according to claim 1, further comprising a common bracket (14; 21; 23; 25; 27) for at least some of the bypass conveyor pipe sections (5; 28; 30; 36; 39 to 41; 44 to 46), which is fixed, on the one hand, to an inner wall (15) of the main conveyor pipe (3) and, on the other hand, to the bypass conveyor pipe sections (5; 28; 30; 36; 39 to 41; 44 to 46).

5. A conveyor device according to claim 4, wherein the bracket (14; 21; 23; 25) has a cross section which opens toward the bypass conveyor pipe sections (5; 28; 30; 36; 39 to 41; 44 to 46).

6. A conveyor device according to claim 1, wherein bypass conveyor pipe sections (28) which are adjacent are arranged overlapping one another axially in the main conveyor pipe (3).

7. A conveyor device according to claim 1, further comprising a bypass conveyor pipe section (30; 36) with a rectangular cross section.

8. A conveyor device according to claim 1, wherein an outlet pipe region (42) of the bypass conveyor pipe section (41) with an outlet opening (7), which is spaced apart from a bypass pipe axis (43), is pivotably arranged relative to a vertical centre plane (33) of the main conveyor pipe (3) about a pivoting angle (δ).

9. A conveyor system with a conveyor device (1) for pneumatically conveying bulk material, comprising:
    a main conveyor pipe (3),
    a plurality of bypass conveyor pipe sections (5; 28; 30; 36; 39 to 41; 44 to 46), which are separate from one another, arranged one behind the other within the main conveyor pipe (3) and the main extent direction of which runs along the main conveyor pipe (3), each of said plurality of bypass conveyor pipe sections comprising:
        a stadium-shaped inlet opening (6) for conveyor gas to enter the bypass conveyor pipe section (5; 28; 30; 36; 39 to 41; 44 to 46), and
        an outlet opening (7) for the conveyor gas to leave the bypass conveyor pipe section (5; 28; 30; 36; 39 to 41; 44 to 46),
    wherein when the main conveyor pipe (3) is installed, in main conveyor pipe segments with a horizontal course component of the main conveyor pipe (3), the inlet opening (6) is arranged in a cross sectional portion of the main conveyor pipe (3), which is located above a cross sectional portion of the main conveyor pipe (3), in which the outlet opening (7) is arranged.

* * * * *